(12) United States Patent
Stayton et al.

(10) Patent No.: US 10,338,210 B2
(45) Date of Patent: Jul. 2, 2019

(54) SYSTEMS AND METHODS FOR PROVIDING GPS ALTERNATIVES ON 1090 MHZ

(75) Inventors: Gregory T. Stayton, Peoria, AZ (US); James R. Troxel, Glendale, AZ (US)

(73) Assignee: AVIATION COMMUNICATION & SURVEILLANCE SYSTEMS LLC, Phoenix, AZ (US)

( * ) Notice: Subject to any disclaimer, the term of this patent is extended or adjusted under 35 U.S.C. 154(b) by 736 days.

(21) Appl. No.: 13/248,979

(22) Filed: Sep. 29, 2011

(65) Prior Publication Data

US 2012/0075138 A1  Mar. 29, 2012

Related U.S. Application Data

(63) Continuation-in-part of application No. 12/748,351, filed on Mar. 26, 2010, and a continuation-in-part of application No. 12/105,248, filed on Apr. 17, 2008, now Pat. No. 9,791,562.

(60) Provisional application No. 61/387,808, filed on Sep. 29, 2010.

(51) Int. Cl.
*G01S 13/74* (2006.01)
*G01S 5/10* (2006.01)

(52) U.S. Cl.
CPC ............... *G01S 13/74* (2013.01); *G01S 5/10* (2013.01)

(58) Field of Classification Search
CPC ...... G01S 13/765; G01S 13/91; G01S 13/878; G01S 5/0081; G01S 2205/003; G01S 7/003; G01S 13/74
USPC ........... 342/36–38, 120, 126, 357.25, 357.26
See application file for complete search history.

(56) References Cited

U.S. PATENT DOCUMENTS

| | | | | |
|---|---|---|---|---|
| 5,636,123 A * | 6/1997 | Rich | ..................... | G01S 5/0072 342/29 |
| 6,529,820 B2 * | 3/2003 | Tomescu | ............... | G01S 5/0063 342/36 |
| 6,788,245 B1 * | 9/2004 | Johnson | ................ | G01S 13/765 342/32 |
| 7,272,495 B2 * | 9/2007 | Coluzzi | ..................... | G01S 5/10 340/988 |
| 8,442,518 B2 * | 5/2013 | Ilarregui | ............ | H04B 7/18508 455/430 |
| 2002/0147542 A1 * | 10/2002 | Tomescu | ............... | G01S 5/0063 701/120 |
| 2007/0252760 A1 * | 11/2007 | Smith | .................... | G01S 5/0027 342/451 |
| 2009/0013365 A1 * | 1/2009 | Huschke | ............ | H04B 7/15528 725/118 |
| 2009/0146896 A1 * | 6/2009 | Guidon | ..................... | H01Q 3/04 343/757 |
| 2009/0303102 A1 * | 12/2009 | Weedon | ................ | G01S 13/723 342/38 |
| 2010/0091924 A1 * | 4/2010 | Wu | ........................ | G01S 5/0221 375/355 |

(Continued)

*Primary Examiner* — Marcus E Windrich
(74) *Attorney, Agent, or Firm* — Dickinson Wright PLLC

(57) ABSTRACT

Systems and methods can provide alternatives to a global positioning system (GPS). For example, certain systems can operate on 1090 MHz and provide for methods of estimating location that can be used in place of GPS. Thus, a method can include obtaining an estimate of position of an own aircraft based on time of arrival of signals from a plurality of ground stations. The calculation of the estimate can be performed in the own aircraft. The method can also include using the estimate of position instead of a position from a global positioning system.

18 Claims, 8 Drawing Sheets

(56) References Cited

U.S. PATENT DOCUMENTS

2010/0311354 A1* 12/2010 Stayton .................... H04L 5/02
455/90.1

* cited by examiner

SYSTEMS AND METHODS FOR PROVIDING GPS ALTERNATIVES ON 1090 MHZ

CROSS REFERENCE TO RELATED APPLICATIONS

This application is related to and claims the priority of U.S. Provisional Patent Application No. 61/387,808, filed Sep. 29, 2010, and is a continuation-in-part of and claims full benefit of and priority to U.S. patent application Ser. No. 12/748,351, filed Mar. 26, 2010 and titled "Systems And Methods For Providing Airborne Aircraft Weather Reporting And Supplemental Occupant Services" and is a continuation-in-part of and claims full benefit of and priority to U.S. patent application Ser. No. 12/105,248, filed Apr. 17, 2008 and titled "Systems and Methods of Providing an ATC Overlay Data Link," the entirety of which applications are hereby incorporated herein by reference.

BACKGROUND

Field

Systems and methods can provide alternatives to a global positioning system (GPS). For example, certain systems can operate on 1090 MHz and provide for methods of estimating location that can be used in place of GPS.

Description of the Related Art

The Global Positioning System, GPS, being used for the NextGen automatic dependent surveillance-broadcast, ADS-B, primary surveillance source may benefit from a backup. GPS can be easily jammed in a local area using methods that include deliberate jamming by the military and uncontrolled illegal jamming. GPS also has time periods of low integrity and accuracy due to real time changing satellite geometries, sometimes resulting in inadequate information for ADS-B applications.

SUMMARY

According to certain embodiments, a method includes obtaining an estimate of position and velocity of an own aircraft based on time of arrival of signals from a plurality of ground stations, wherein calculation of the estimate is performed in the own aircraft. The method also includes using the estimate of position instead of a position from a global positioning system.

A method, according to certain embodiments, includes obtaining, at a master ground station, a high accuracy timing signal. The method also includes transmitting to a plurality of slave stations, the highly accurate timing signal. The method further includes communicating to an aircraft using the high accuracy timing signal.

In certain embodiments, a method includes obtaining, at a slave ground station, a high accuracy timing signal using a phase lock loop on a signal from a master station. The method also includes comparing the high accuracy timing signal to a reference source to confirm reliability of the high accuracy timing signal. The method further includes communicating to an aircraft using the high accuracy timing signal.

A system according to certain embodiments includes at least one processor and at least one memory including computer program instructions. The at least one memory and computer program instructions are configured to, with the at least one processor, cause the system at least to obtain an estimate of position of an own aircraft based on time of arrival of signals from a plurality of ground stations, wherein calculation of the estimate is performed in the own aircraft. The at least one memory and computer program instructions are also configured to, with the at least one processor, cause the system at least to use the estimate of position and if needed derived velocity instead of a position from a global positioning system.

In certain embodiments, a system includes at least one processor and at least one memory including computer program instructions. The at least one memory and computer program instructions are configured to, with the at least one processor, cause the system at least to obtain, at a master ground station, a high accuracy timing signal. The at least one memory and computer program instructions are also configured to, with the at least one processor, cause the system at least to transmit to a plurality of slave stations, the highly accurate timing signal. The at least one memory and computer program instructions are further configured to, with the at least one processor, cause the system at least to communicate to an aircraft using the high accuracy timing signal.

According to certain embodiments, a system includes at least one processor and at least one memory including computer program instructions. The at least one memory and computer program instructions are configured to, with the at least one processor, cause the system at least to obtain, at a slave ground station, a high accuracy timing signal using a phase lock loop on a signal from a master station. The at least one memory and computer program instructions are configured to, with the at least one processor, cause the system at least to compare the high accuracy timing signal to a reference source to confirm reliability of the high accuracy timing signal. The at least one memory and computer program instructions are configured to, with the at least one processor, cause the system at least to communicate to an aircraft using the high accuracy timing signal.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Various systems and methods can be used to provide an alternative to a global positioning system (GPS), particularly for use by aircraft. The following example embodiments should not be considered to be limiting, but merely to exemplify various ways in which alternatives, such as transmissions on 1090 MHz, can be used to supplement GPS.

Figure 1:
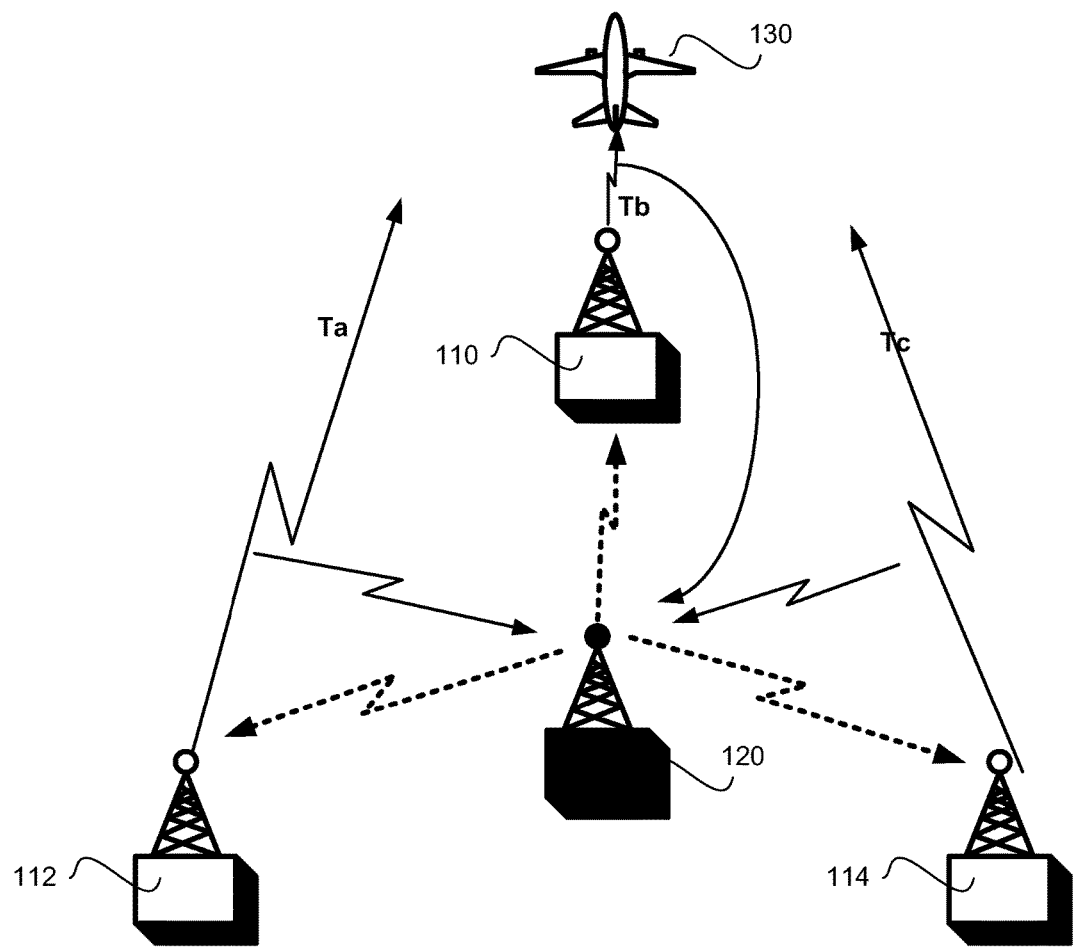
FIG. 1 illustrates a system according to certain embodiments.

FIG. 1 illustrates a system according to certain embodiments. More particularly, FIG. 1 illustrates a master automatic dependent surveillance-broadcast (ADS-B) station with a number of slave stations. The master station may be the clocking reference for all of the slave stations. These stations may be located far enough apart to provide a good geometric position, such as 30 Nmi., for an aircraft up to an aircraft maximum receiver range 100+ Nmi. away to triangulate the aircraft's own position based on range time delays Ta, Tb, and Tc, relative to a reference station for each station within the local environment. The reference station may be the master station or yet another station.

In certain embodiments there is no need for the aircraft to know which ground station is a master station and which station is a slave station. In other embodiments, the aircraft receives an indication of which station(s) are master stations.

The slave station clocking references and/or time of day may be all synchronized to the master station carrier frequency (e.g., 1090 MHz) or may be synchronized to an external standard which may be available to all stations, such as the National Institute of Standards and Technology (NIST)'s radio broadcasted time, such as WWV. Other sources of time are also possible, such as an emergency source located in an airborne vehicle or satellite. In certain embodiments, the source of time is completely independent from a global positioning system (GPS) source. For example, while the global navigation satellite system (GLONASS) may be in some ways independent of GPS, it may nevertheless have some dependency on GPS, particularly since it is similarly a satellite-based solution. Thus, for example, some systems rely on a ground-based atomic clock source.

Each station may accurately send the station's own latitude and longitude position or position relative to any reference such as earth frame coordinates, station ID, station elevation above sea level or elevation/altitude relative to any reference such as earth frame coordinates, station status, accuracy, integrity, offset timing, guard band timing, maximum range, accuracy at some range or ranges, propagation delay, co-variance parameters, relative time, time of day or any other information relative to providing a method for another vehicle or aircraft to determine its position with time in a broadcasted message. The position and elevation of a slave station may, in certain embodiments be provided relative to a corresponding master ground station. Alternatively, in certain embodiments, an identifier of the ground station is provided, and an aircraft uses a database that correlates the identifier to a location and/or elevation.

The message may be sent, for example, by any technique disclosed in U.S. patent application Ser. No. 12/105,248, filed Apr. 17, 2008, and entitled SYSTEMS AND METHODS FOR PROVIDING AN ATC OVERLAY DATA LINK, which is incorporated in its entirety herein by reference, on a Traffic Information Services Broadcast, TIS-B, or on an Automatic Dependent Surveillance Re-Broadcast, ADS-R, (See RTCA DO-260 for more information about TIS-B or ADS-R), or on a Mode S reply, (See RTCA DO-181 for more information about Mode S replies), which may help to minimize any additional interference within the 1090 MHz Air Traffic Control Radar environment. This message may also be sent, for example, as an ADS-B, TIS-B, ADS-R, Mode S reply pulse position message. If no TIS-B or ADS-R messages are being transmitted, a special message created for this purpose can be used to guarantee a minimum transmission update rate.

The 1090 MHz frequency of the message sent by the master station may be very accurate and may be used to synchronize each slave station's local clock timing. This may be helpful so as to avoid the need for a highly accurate stand-alone timing mechanism for each station. An example, of a highly accurate stand-alone timing mechanism is an atomic clock, such as a Cesium clock. The desired frequency accuracy for the slave stations can be supplied by the master station transmission frequency source. The slave station frequency source may be synchronized to the master station and may use a synthesized signal generator (for example, with stand-alone +/−30 Hz long term stability and accuracy), as shown in FIG. 1, when separate accurate Cesium clocks are not used at the slave stations.

Also, the reception of the master or slave station radio frequency (RF) emissions may be used by a vehicle or aircraft to synchronize the vehicle or aircraft's own local clock timing for more accurate time measurements. Thus, even a receiving aircraft may benefit from a highly accurate timing source in, for example, a master ground station.

Each station may have a unique identification number that may be sequentially numbered and may sequentially transmit so that the master station and all slave stations and timing measurements may be easily identified and correlated by the aircraft.

The master station or reference station transmission may be used by aircraft to start a range timer clock and range time delays may be measured for the slave stations relative to the master station transmission time. Slave station timing may be sufficiently offset to permit range measurements out to the maximum receiver range for DO-260B A3 sensitivity receivers or any other desired sensitivity. For example in FIG. 1, a time offset of 1200 uSec may be used where at 6.15 uSec per nautical mile (approximately the speed of light) a range offset of approximately 200 nautical miles may be obtained between the master station transmission and the slave station transmission. The other slave station transmissions may also each have an additional 1200 uSec offset, as shown in FIG. 1. Each of the slave stations may have an additional fixed guard band timing offset to account for station geometric spacing to prevent message overlaps that might occur for certain aircraft position spacing.

The master station may transmit at a permitted federal aviation administration (FAA) rate of, for example, once per second, starting a chain of transmissions with timing offsets from the slave stations. For acceptable probability of receipt by aircraft, a master station transmission rate of higher or lower than once per second may be used. The master station may be associated with several or numerous slave stations. For example, a single master station could be used for the continental United States. Alternatively, a master station could be used in connection with a group of from three to five slave stations in a geographic region. Slave stations can be positioned so that at least one slave station of a group is within reception range of a second master station or multiple master stations or at least in range of one of the slave stations of another master station.

If an aircraft receives a transmission that exceeds the timing for the maximum range and/or accuracy of the system from one or several slave stations (or master station (s)), the aircraft may discard this information, and may declare position calculations based on this system cluster of stations as invalid. Maximum range timing, such as 1200 µSec, as well as station position such as latitude, longitude, and elevation or altitude can be known in advance from industry standards, databases, or may be transmitted in the ground station messages.

Systems and techniques can be used to decommission bad slave stations or master stations. For example, the stations may listen to broadcasts from one another and analyze the broadcasts to confirm that the timing information and other signal characteristics are accurate. If it is determined that one station differs significantly from other local stations, the system may determine that the station at variance needs maintenance and may decommission that station. The system may operate based on reports by slave stations that one or more stations that can be heard by the slave station appears to have inaccurate timing information. A station may, in particular, compare timing information from one cluster with timing information from one or more other clusters and report differences to other members of the same cluster or to members of the other cluster or clusters.

A slave station within a cluster may be designated as a backup master station. If a master station is decommissioned, becomes inoperable, or loses communication with the backup master station, the backup master station can begin to function as a master station until the master station is placed on-line again. Multiple master stations may be used in a region. In certain implementations, the master stations may have overlapping coverage areas, thereby providing redundancy and error checking capability to the slave stations in the area.

Communication between the master station and slave stations can be conducted on 1090 MHz, for example using a horizontal polarization for communication amongst stations and a vertical polarization for communication with aircraft. Additionally, beam forming techniques (for example, the use of a Yagi antenna array) can be used to direct communications to adjacent stations while minimizing interference within a coverage volume. Alternatively, communication amongst the stations can be conducted using a microwave dish relay, coaxial cables, fiber optic cables, or any other means of communication.

As shown in FIG. 1, each station (slave stations 110, 112, and 114, and master station 120) may transmit its Latitude/Longitude position accurate to <1 Ft. An aircraft (130) within a coverage volume of a cluster of the stations can calculate its own position from its barometric ("baro") altitude, and from the station propagation time delays. Aircraft reply timing/ranging can be determined similar to active ranging except aircraft (A/C) range timer can start with receipt of ADS-B reply from the Master Station (120), which can serve as T0.

Slave station #1 (110) and the other slave stations (112 and 114) can be numerically controlled oscillator (NCO) phase locked to a master station frequency. The slave stations 110, 112, and 114 can operate at a pulse rate frequency (PRF) of T/Sec. Each slave station can operate at T0+Fixed Offset (for station spacing)+(1200×Nth station number μsec) based on an intermediate frequency (IF) clock count. Master Station can operate at 1090 MHZ+/−30 Hz with a PRF of T/Sec from T0 (that is to say, with a zero offset). Of course, other configurations are possible. For example, all stations may transmit simultaneously or nearly simultaneously, one of the slave stations may broadcast with zero offset while the master station broadcasts with an offset, or the stations may transmit at random time intervals whose interval values are transmitted to aircraft for timing correlation purposes.

In FIG. 1, the solid wireless links may show the transmission of signals that can be measured by the aircraft 130. By contrast, the broken line wireless links may indicate signals indicative of propagation delay sent back from the master station (120) to each of the slave stations (110, 112, and 114). As shown in FIG. 1, it is not necessary for the aircraft (130) to receive signals from every ground station (there is no illustrated signal received from master base station 120, for example). Moreover, the aircraft 130 can communication directly or indirectly with the master base station 120, using, for example, an ADS-B data link.

Figure 2:
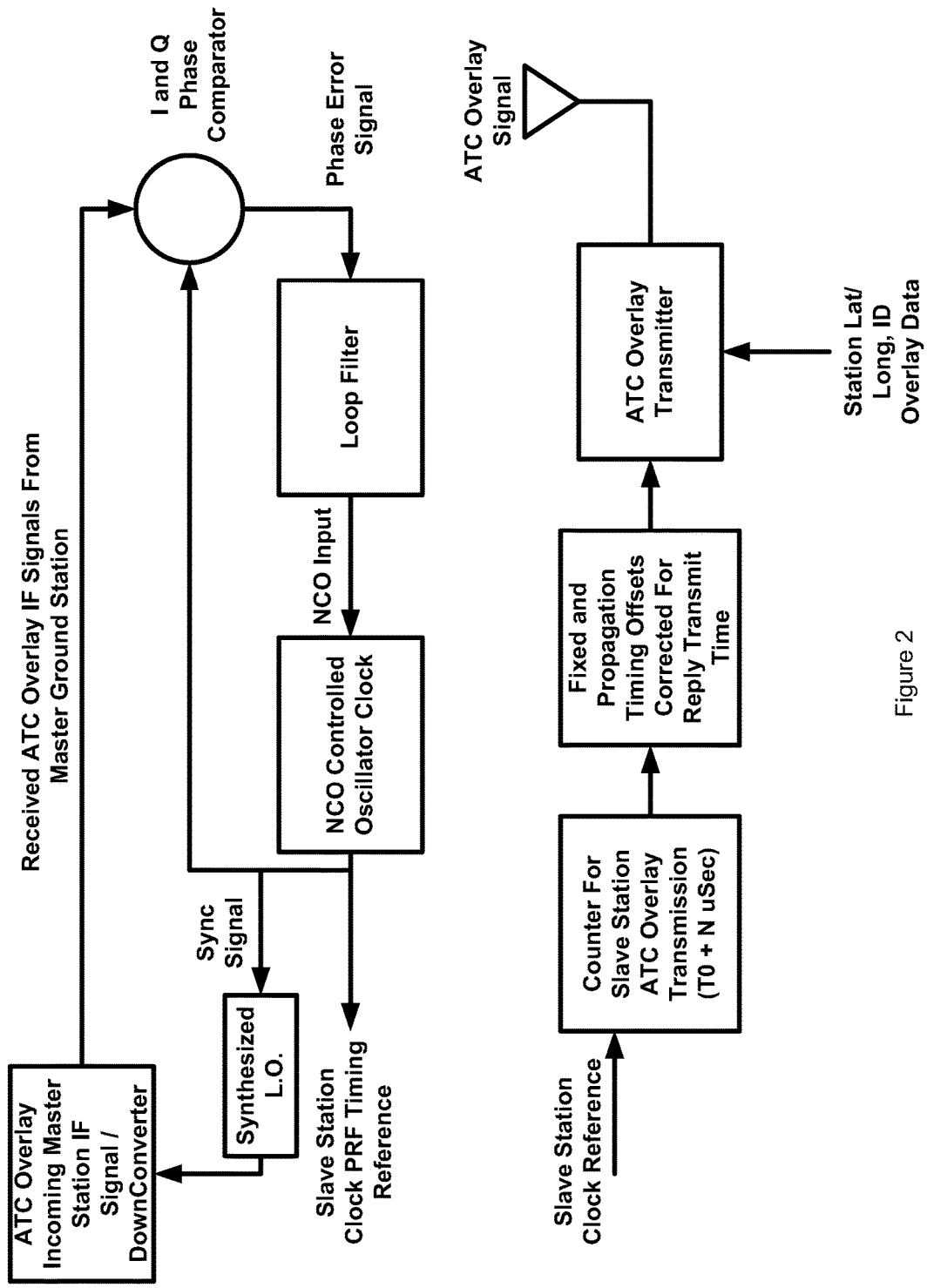
FIG. 2 illustrates a slave station transceiver according to certain embodiments.

FIG. 2 illustrates a slave station transceiver according to certain embodiments. More particularly, FIG. 2 illustrates exemplary slave station functional blocks for synchronizing a numerically controlled oscillator (NCO) clock to the incoming 1090 MHz transmission from the master station. The input signal may be first down-converted by a synthesized local oscillator and mixer (after being received by the receiver front end) to an Intermediate Frequency, IF.

The IF signal may be amplified, filtered, and demodulated to an I and Q output. The I and Q components may be used to determine the phase error of the signal relative to the NCO clock. The NCO clock may then be driven by the averaged phase error from the transmitted output of the I and Q phase comparator which may then be provided by the loop filter to phase lock the NCO clock to the incoming IF signal from the master station. This signal may then be used as the slave station clock reference for determining when to transmit its next position transmission, and may also be used to synchronize the down-converter synthesized local oscillator to reduce the phase noise of the system.

Timing accuracy over temperature and aging of master station 1090 MHz reference oscillator may be maintained within the slave ground station phase locked NCO oscillator clock. Additionally, an air traffic control (ATC) overlay signal (see, for example, "SYSTEMS AND METHODS FOR ENHANCED ATC OVERLAY MODULATION," U.S. patent application Ser. No. 12/482,431, which is hereby incorporated herein by reference in its entirety) from the slave station may be received by the master ground station and propagation delay corrections can be sent back to the slave station from the master station.

Fixed propagation delay elimination due to the range between stations may be removed by use of a fixed constant range time determined by an accurate survey of each station's location. Additionally, the receipt of slave station transmissions by the master station may be used relative to the master station's timing clock to determine slave station propagation errors, and all stations may compare other station transmissions that are within their reception range as a slave or master station integrity monitor.

This propagation error and integrity data may then be broadcast to each associated slave station to further correct the timing offset with a variable propagation error offset, resulting in a higher accuracy and higher integrity system. Slave stations may also test the master station timing by, for instance, examining the time between its transmissions as an additional integrity monitor of the total system. More than one master station may be provided and used for a clustering of a set of stations, and for redundancy and increased integrity within the entire system of stations.

Other techniques for phase locking, determining the frequency of the signal coming in relative to a receiver's local oscillator, and using the appropriate local oscillator (as determined by the maximum incoming demodulated signal strength using matched filters) are also permitted. See, for example, "Systems And Methods For Demodulating Multiply Modulated Communications Systems," U.S. Patent Application Publication No. 2010/0014615, which is hereby incorporated herein by reference in its entirety).

Figure 3:
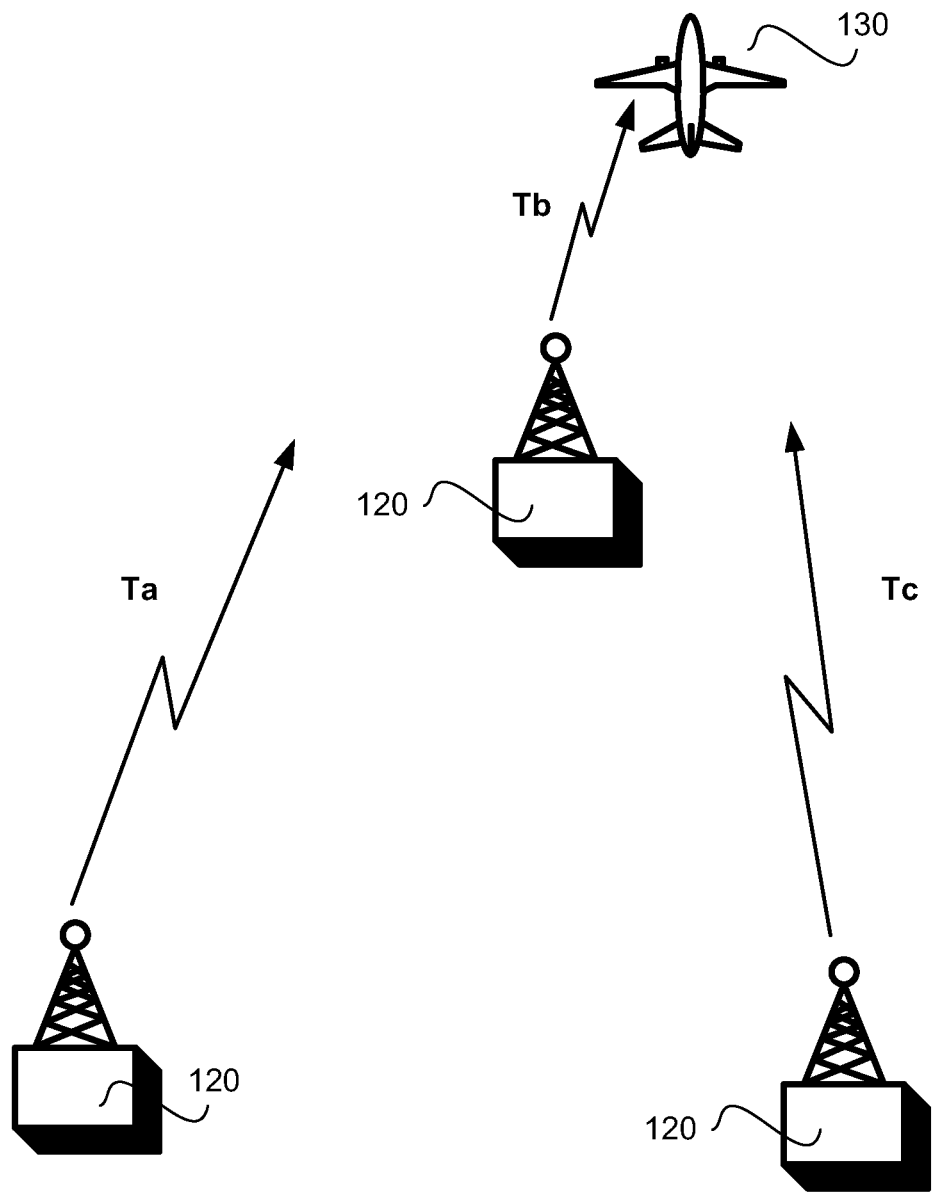
FIG. 3 illustrates an alternative system according to certain embodiments.

FIG. 3 illustrates an alternative system according to certain embodiments. As shown in FIG. 3, an aircraft 130 can use precision time broadcasts from ADS-B ground stations 130, which can be configured as independent master ground stations or simply as autonomous ground stations. The aircraft 130 can then determine range differences to the stations 130, and calculate its own position.

Figure 4:
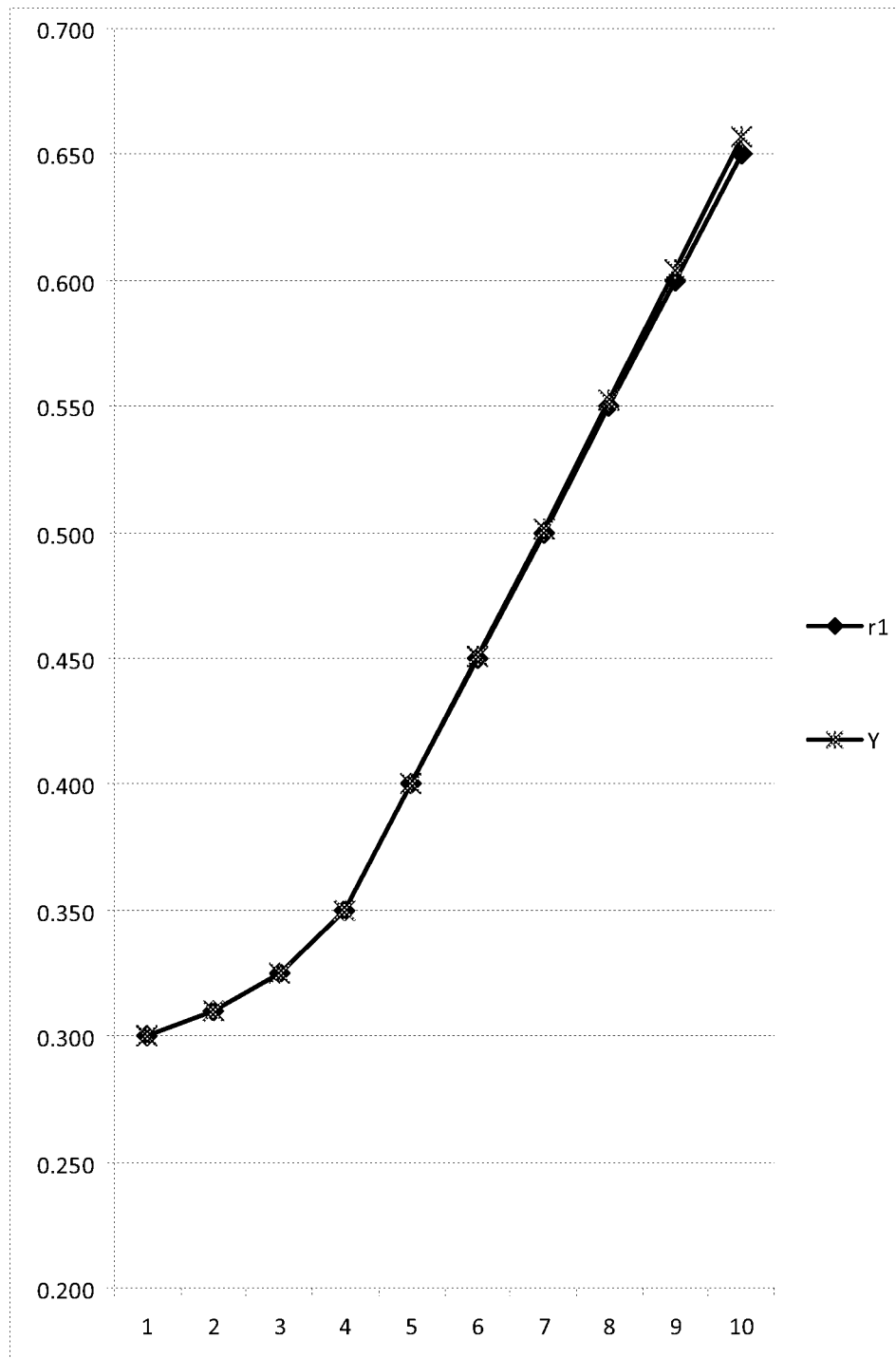
FIG. 4 illustrates an estimation of an approximation and curve fit for a time difference between a master or reference station and another station as received by a vehicle or aircraft.

FIG. 4 illustrates an estimation of an approximation and curve fit for a time difference between a master or reference station and another station as received by a vehicle or aircraft. Table 1, below, provides values of r1, d, and Y, which are plotted in FIG. 4.

TABLE 1

| r1 | d | Y |
|---|---|---|
| 0.300 | 0.000 | 0.300 |
| 0.310 | 0.010 | 0.310 |
| 0.325 | 0.025 | 0.325 |
| 0.350 | 0.050 | 0.350 |
| 0.400 | 0.100 | 0.400 |
| 0.450 | 0.150 | 0.451 |
| 0.500 | 0.200 | 0.501 |
| 0.550 | 0.250 | 0.553 |
| 0.600 | 0.300 | 0.605 |
| 0.650 | 0.350 | 0.657 |
| 0.700 | 0.400 | 0.711 |
| 0.750 | 0.450 | 0.765 |
| 0.800 | 0.500 | 0.821 |
| 0.850 | 0.550 | 0.878 |
| 0.900 | 0.600 | 0.937 |
| 0.950 | 0.650 | 0.997 |
| 1.000 | 0.700 | 1.059 |
| 1.050 | 0.750 | 1.122 |
| 1.100 | 0.800 | 1.188 |
| 1.150 | 0.850 | 1.256 |
| 1.200 | 0.900 | 1.327 |
| 1.250 | 0.950 | 1.399 |
| 1.300 | 1.000 | 1.475 |

Thus, in FIG. 4, Sin h×function "Y" can serve as an approximation and curve fit for a time delay of a master or slave station for a constant time difference between "r1" a master or reference station and another station as received by the vehicle or aircraft, for various station range distance offsets d. A set of these curves from measurements by the aircraft or vehicle may be used to determine an intersection between all pairs of curves to determine a 3-D position in space. This may be done by converting all station coordinates into an Earth Frame Reference System, then determining the intersection of the measurement curves, converting the "z" (elevation) parameter into a standard elevation parameter above a standard geoid, and converting the "x" and "y" positions into Lat/Long coordinates.

A first approximate calculation or an integrity check of the elevation parameter may be obtained from a barometric altitude source on board the vehicle or aircraft or from another altitude source, such as a radar or laser measurement of distance above the surface. The barometric altitude may be used for an integrity comparison of the barometric altitude and calculated altitude or the barometric altitude may be used as a starting point for any iterative calculation process to more rapidly compute a 3-D position.

Any method for measuring relative distance, relative time or pseudo ranges such as those used to determine GPS positioning may be used by the system for aircraft to compute their position and velocity. Additionally, these methods may be supplemented by methods for measuring bearing of the ground stations. Thus, in a certain embodiment for example, an aircraft may determine a first bearing to a first ground station and a second bearing to a second ground station and may obtain a location estimate based on a known location of the ground stations and the bearing from the own aircraft to each respective ground station. Other positioning techniques are also permitted.

Figure 5:
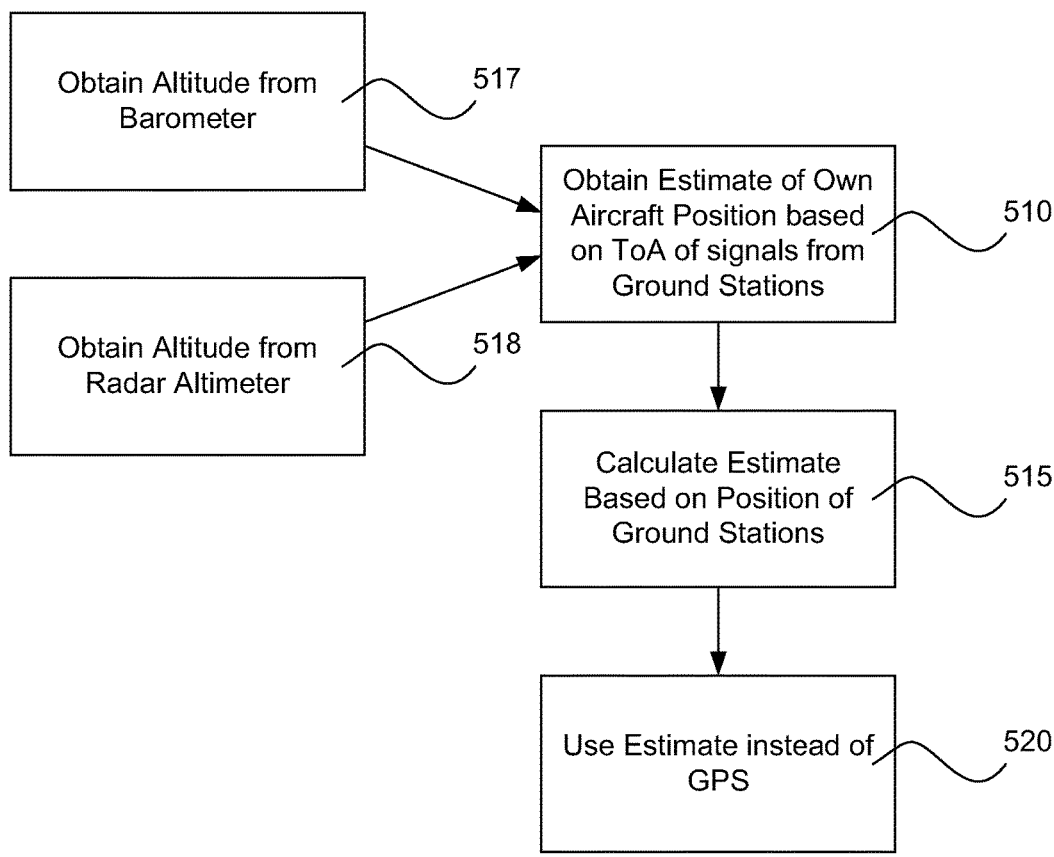
FIG. 5 illustrates a method according to certain embodiments.

FIG. 5 illustrates a method according to certain embodiments. The method of FIG. 5 may be performed by a vehicle, such as an aircraft, for example, a fixed-wing aircraft or helicopter. Alternatively, the method could be performed by, for example, a hand-held device. As shown in FIG. 5, a method can include, at 510, obtaining an estimate of position of an own aircraft based on time of arrival (ToA) of signals from a plurality of ground stations. Calculation of the estimate is performed in the own aircraft.

The method can also include, at 520, using the estimate of position instead of a position from a global positioning system.

The signals from the plurality of ground stations can be transmitted on 1090 MHz+/−about 30 Hz. For example, the signals can be or include air traffic control data overlay signals.

Moreover, the signals can include respective time of transmission information, wherein the plurality of ground stations are synchronized. The aircraft can also synchronize itself to the timer of the ground stations using a phase lock loop technique. A frequency determining technique may also be used to simplify phase lock loop requirements by narrowing the bandwidth frequency over which the lock must be maintained. One example is use of multiple matched filters with multiple demodulator oscillator frequencies to find the strongest demodulated signal that is associated with a particular demodulator oscillator frequency so that this oscillator frequency that is close to the incoming signal can then be phase locked to the incoming signal.

The obtaining the estimate of the position can include, at 515, calculating based on position information of a ground station, wherein the position information of a ground station is provided in a respective signal of the signals from the plurality of ground stations. The position information can be either explicit or implicit information. An example of explicit information is the latitude, longitude, and elevation of the ground station. An example of implicit information is simply a reference number that can be used to look up the latitude, longitude, and elevation in a database. The information can also be partially implicit. For example, a latitude and longitude can be provided, but the elevation can be implicit, based on an assumption that the ground station is at ground level and has an antenna located at a standard position above ground. Thus, in certain embodiments, the signals include respective unique identification numbers of the plurality of ground stations.

The obtaining the estimate can include, at 517, obtaining a barometric altitude from a barometric altitude source on board the own aircraft. Alternatively, or in addition, the obtaining the estimate can include, at 518, obtaining an Above Ground Level (AGL) altitude from a radar altimeter source on board the own aircraft.

Figure 6:
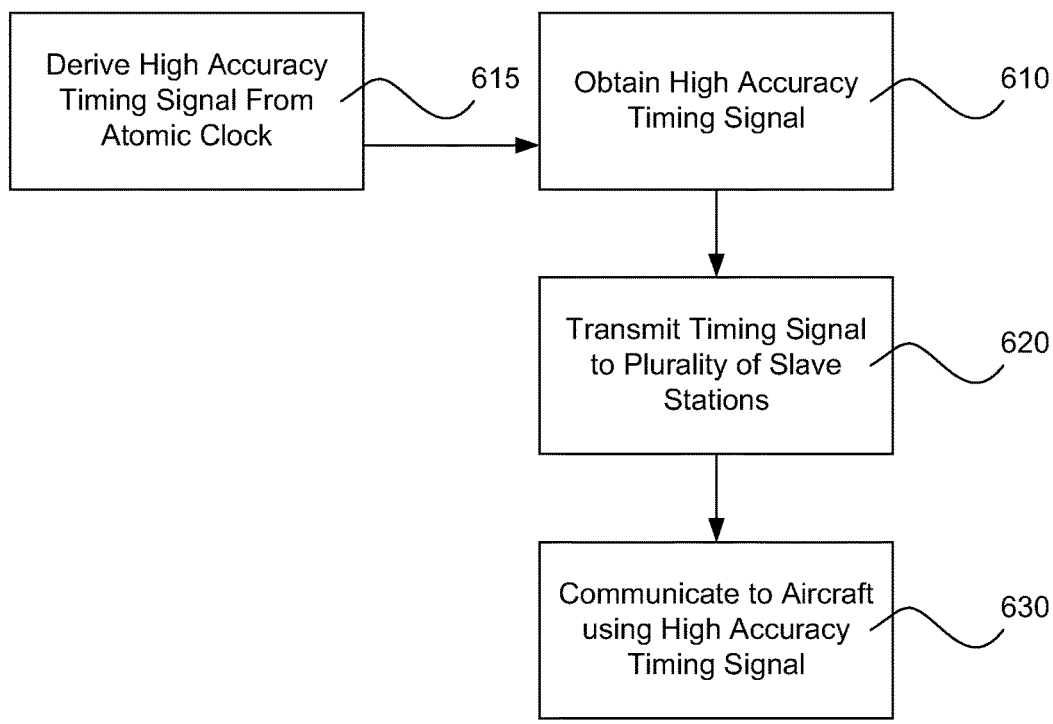
FIG. 6 illustrates another method according to certain embodiments.

FIG. 6 illustrates another method according to certain embodiments of the present invention. The method of FIG. 6 can be performed by, for example, a master ground station or autonomous station. As shown in FIG. 6, a method can include, at 610, obtaining, at a master ground station, a high accuracy timing signal. The method can also include, at 620, transmitting to a plurality of slave stations, the highly accurate timing signal. The method can further include, at 630, communicating to an aircraft using the high accuracy timing signal. The features of transmitting to the plurality of slave stations can be omitted when, for example, the master ground station is not the master of a cluster, such as when the master ground station is serving as a backup master station or as an autonomous ground station.

The obtaining the high accuracy timing signal can include, at 615, obtaining a time from an atomic clock. The transmitting to the plurality of slave stations can include transmitting on 1090 MHz+/−about 30 Hz.

The transmitting can be performed about once per second and can be performed using a horizontal polarization. The master ground station transmits using a vertical polarization or both a horizontal polarization and a vertical polarization. This can be for the transmissions at 620 or for other transmissions, such as the communicating to the aircraft. A same signal can be transmitted to the aircraft and received by the plurality of slave stations.

Figure 7:
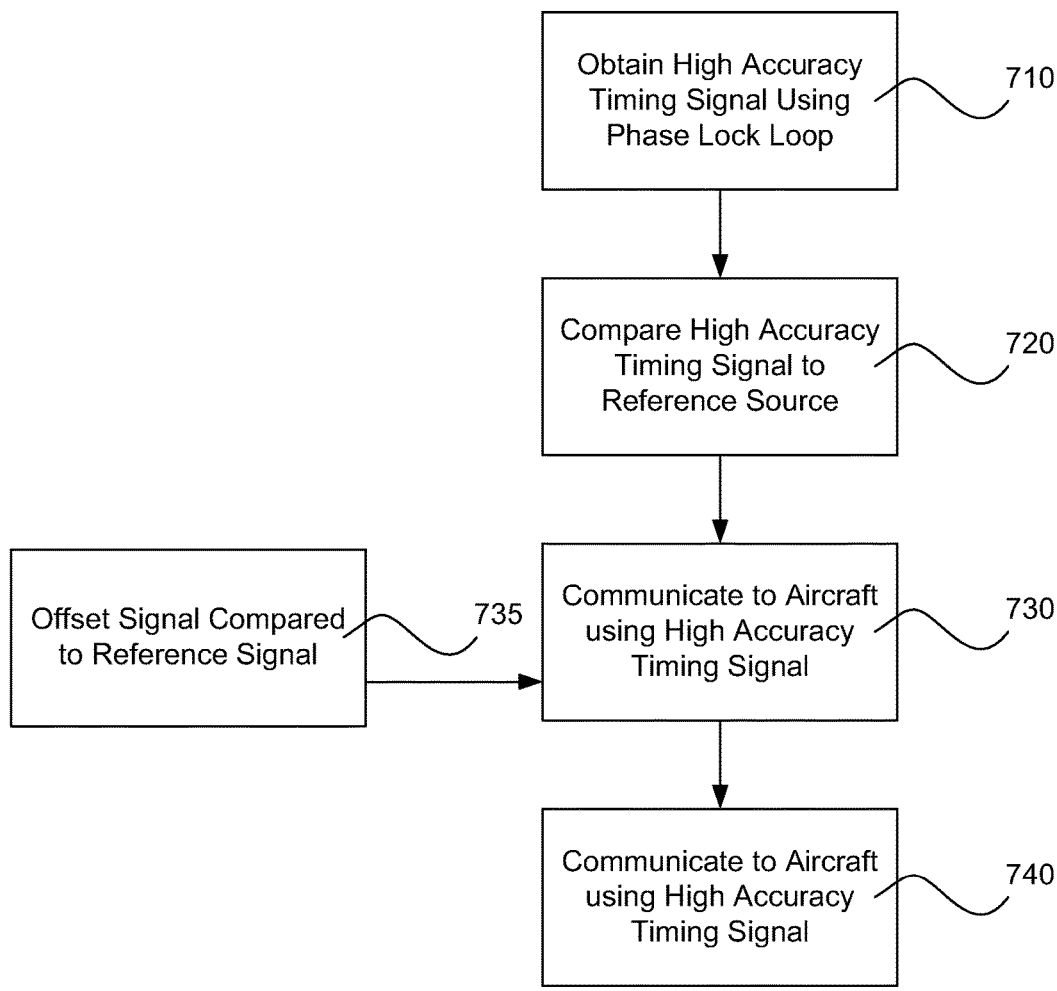
FIG. 7 illustrates a further method according to certain embodiments.

FIG. 7 illustrates a method according to certain embodiments of the present invention. The method of FIG. 7 can be performed by, for example, a slave ground station. As shown in FIG. 7, a method can include, at 710, obtaining, at a slave ground station, a high accuracy timing signal using a phase lock loop on a signal from a master station. The method can also include, at 720, comparing the high accuracy timing signal to a reference source to confirm reliability of the high accuracy timing signal. The method can further include, at 730, communicating to an aircraft using the high accuracy timing signal.

The obtaining the high accuracy timing signal can include receiving the signal from the master station on 1090 MHz+/−about 30 Hz. The comparing to the reference source comprises comparing to at least a second high accuracy time signal obtained from at least a second master or slave station.

In certain embodiments, the slave station's time can be compared to a given master station to several other master stations or their slave stations to determine whether any particular station is different from the rest.

Also the master stations' slave stations can be monitored (either by the slave stations or the master station) to see if that master's slave stations are all in agreement within a given acceptable tolerance for the timing signal, as to provide an accurate 1090 MHz signal.

The communicating to the aircraft can include, at 735, providing an offset signal to the aircraft a predetermined offset from a reference signal from the master station.

The method can further include, at 740, applying a timing offset to correct propagation error in the communicating to the aircraft.

Figure 8:
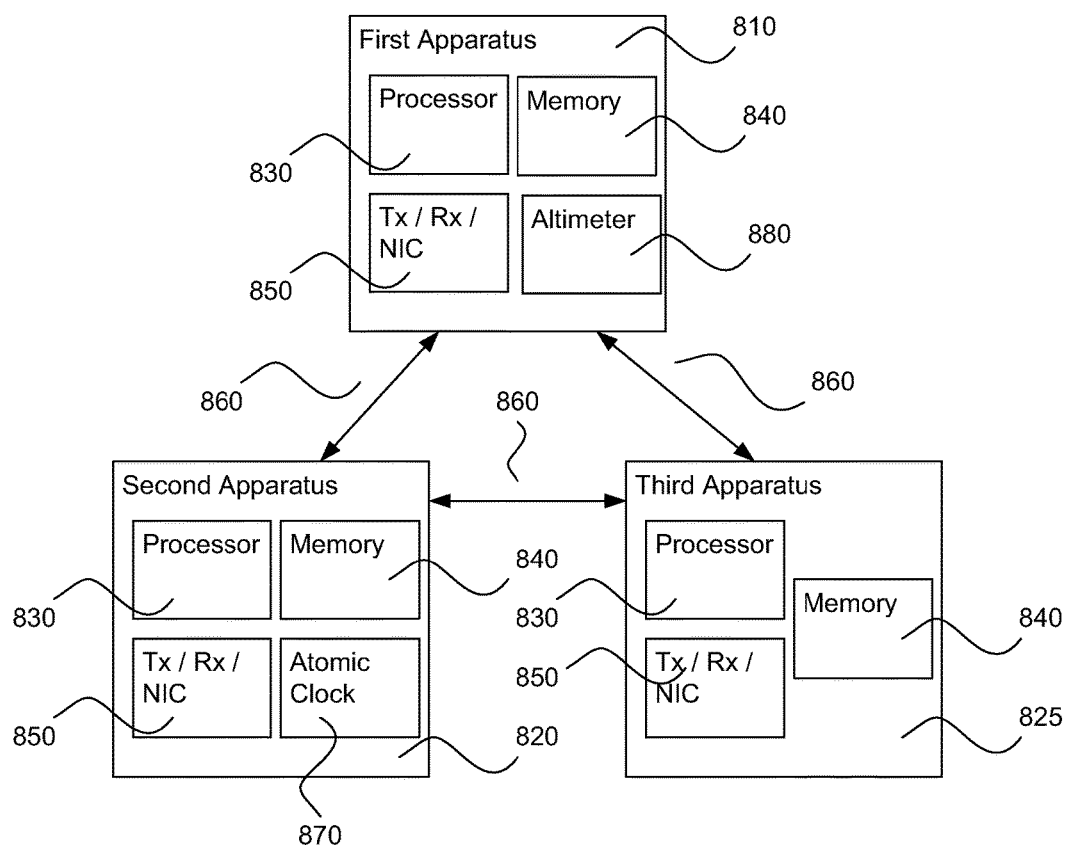
FIG. 8 illustrates a system according to certain embodiments of the present invention.

FIG. 8 illustrates a system according to certain embodiments of the present invention. As shown in FIG. 8, the system can include a first apparatus 810 (such as an aircraft), a second apparatus 820 (such as a master ground station), and a third apparatus 825 (such as a slave ground station). Each of the apparatuses may be equipped with at least one processor 830, at least one memory 840 (including computer program instructions), and transceiver/network interface card 850 (other communications equipment, such as an antenna, may also be included). The apparatuses may be configured to communicate with one another over interfaces 860, which are shown as wired interfaces, but may incorporate both wireless and wired interfaces, and may be merely wireless interfaces.

The at least one processor 830 can be variously embodied by any computational or data processing device, such as a central processing unit (CPU), Field Programmable Gate Array (FPGA) or application specific integrated circuit (ASIC). The at least one processor 830 can be implemented as one or a plurality of controllers.

The at least one memory 840 can be any suitable storage device, such as a non-transitory computer-readable medium. For example, a hard disk drive (HDD) or random access memory (RAM) can be used in the at least one memory 840. The at least one memory 840 can be on a same chip as the at least one processor 830, or may be separate from the at least one processor 830.

The computer program instructions may be any suitable form of computer program code. For example, the computer program instructions may be a compiled or interpreted computer program.

The at least one memory 840 and computer program instructions can be configured to, with the at least one processor 830, cause a hardware apparatus (for example, the avionics in an aircraft or ground station) to perform a process, such as the processes shown in FIGS. 4-7 or any other process described herein.

The apparatuses may each have their own unique components. For example, the second apparatus 820 can include an atomic clock 870, such as a Cesium clock. Likewise, the first apparatus 810 can include an altimeter, such as a radar altimeter or a barometer.

Thus, in certain embodiments, a non-transitory computer-readable medium can be encoded with computer instructions that, when executed in hardware perform a process, such as one of the processes described above. Alternatively, certain embodiments of the present invention may be performed entirely in hardware.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
obtaining an estimate of position of an own aircraft based on time of arrival of signals from a plurality of ground stations, wherein calculation of the estimate is performed in the own aircraft, wherein the signals from the plurality of ground stations are transmitted on 1090 MHz+/−about 30 Hz, and wherein the signals comprise data overlay signals wherein each of the respective data overlay signals respectively comprise a signal modulated with a first message and further modulated with a second overlay message, wherein the first message and second overlay message may be independently demodulated from a particular data overlay signal; and
using the estimate of position instead of a position from a global positioning system.

2. The method of claim 1, wherein the signals comprise respective time of transmission information, wherein the plurality of ground stations are synchronized.

3. The method of claim 1, wherein the obtaining the estimate of the position comprises calculating based on position information of a ground station, wherein the position information of a ground station is provided in a respective signal of the signals from the plurality of ground stations.

4. The method of claim 1, wherein the signals comprise respective unique identification numbers of the plurality of ground stations.

5. The method of claim 1, wherein the obtaining the estimate comprises obtaining a barometric altitude from a barometric altitude source on board the own aircraft.

6. The method of claim 1, wherein the obtaining the estimate comprises obtaining an Above Ground Level (AGL) altitude from a radar altimeter source on board the own aircraft.

7. A method, comprising:
obtaining, at a master ground station, a high accuracy timing signal;
transmitting to a plurality of slave ground stations, the highly accurate timing signal; and
communicating a data overlay signal to an aircraft using the high accuracy timing signal, wherein the aircraft is configured to determine an own location based on the communication using the high accuracy timing signal,
wherein the transmitting to the plurality of slave stations comprises transmitting on 1090 MHz+/−about 30 Hz; and
wherein the data overlay signal comprises a signal modulated with a first message and further modulated with a second overlay message, wherein the first message and second overlay message may be independently demodulated from the data overlay signal.

8. The method of claim 7, wherein the obtaining the high accuracy timing signal comprises obtaining a time from an atomic clock.

9. The method of claim 7, wherein the transmitting is performed about once per second.

10. The method of claim 7, wherein the transmitting is performed using a horizontal polarization.

11. The method of claim 7, wherein the master ground station transmits using a vertical polarization or both a horizontal polarization and a vertical polarization.

12. A method, comprising:
obtaining, at a slave ground station, a high accuracy timing signal using a phase lock loop on a signal from a master ground station, wherein the obtaining the high accuracy timing signal comprises receiving the signal from the master station on 1090 MHz+/−about 30 Hz;
comparing the high accuracy timing signal to a reference source to confirm reliability of the high accuracy timing signal; and
communicating a data overlay signal to an aircraft using the high accuracy timing signal, wherein the aircraft is configured to determine an own location based on the communication using the high accuracy timing signal; and
wherein the data overlay signal comprises a signal modulated with a first message and further modulated with a second overlay message, wherein the first message and second overlay message may be independently demodulated from the data overlay signal.

13. The method of claim 12, wherein the comparing to the reference source comprises comparing to at least a second high accuracy time signal obtained from at least a second master or slave station.

14. The method of claim 12, wherein the communicating to the aircraft comprises providing an offset signal to the aircraft a predetermined offset from a reference signal from the master station.

15. The method of claim 12, further comprising:
applying a timing offset to correct propagation error in the communicating to the aircraft.

16. A system, comprising:
at least one processor; and
at least one memory including computer program instructions,
wherein the at least one memory and computer program instructions are configured to, with the at least one processor, cause the system at least to
obtain an estimate of position of an own aircraft based on time of arrival of signals from a plurality of ground stations, wherein calculation of the estimate is performed in the own aircraft, wherein the signals from the plurality of ground stations are transmitted on 1090 MHz+/−about 30 Hz, and wherein the signals comprise data overlay signals wherein each of the respective data overlay signals respectively comprise a signal modulated with a first message and further modulated with a second overlay message, wherein the first message and second overlay message may be independently demodulated from a particular data overlay signal; and
use the estimate of position instead of a position from a global positioning system.

17. The system of claim 16, wherein the at least one memory and computer program instructions are configured to, with the at least one processor, cause the system at least to obtain the estimate by obtaining a barometric altitude from a barometric altitude source on board the own aircraft.

18. The system of claim 16, wherein the at least one memory and computer program instructions are configured to, with the at least one processor, cause the system at least to obtain the estimate by obtaining an above ground level (AGL) altitude from a radar altimeter source on board the own aircraft.

* * * * *